United States Patent
McNabb (10) Patent No.: US 11,294,615 B2
(45) Date of Patent: Apr. 5, 2022

(54) INCORPORATING EXTERNAL GUESTS INTO A VIRTUAL REALITY ENVIRONMENT

(71) Applicant: Disney Enterprises, Inc., Burbank, CA (US)

(72) Inventor: Michael McNabb, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 119 days.

(21) Appl. No.: 15/473,571

(22) Filed: Mar. 29, 2017

(65) Prior Publication Data
US 2018/0285050 A1  Oct. 4, 2018

(51) Int. Cl.
| | |
|---|---|
| *G06F 3/14* | (2006.01) |
| *H04L 65/1069* | (2022.01) |
| *A63F 13/53* | (2014.01) |
| *A63F 13/25* | (2014.01) |
| *A63F 13/211* | (2014.01) |
| *A63F 13/42* | (2014.01) |
| *A63F 13/5255* | (2014.01) |
| *A63F 13/212* | (2014.01) |
| *A63F 13/35* | (2014.01) |
| *G06F 3/01* | (2006.01) |

(52) U.S. Cl.
CPC .......... *G06F 3/1454* (2013.01); *A63F 13/211* (2014.09); *A63F 13/212* (2014.09); *A63F 13/25* (2014.09); *A63F 13/35* (2014.09); *A63F 13/42* (2014.09); *A63F 13/5255* (2014.09); *A63F 13/53* (2014.09); *H04L 65/1069* (2013.01); *G06F 3/011* (2013.01)

(58) Field of Classification Search
CPC . G06T 19/006; G06T 2219/024; G06F 3/011; G06F 3/1454; A63F 2300/8082; A63F 13/10; A63F 13/53; H04L 65/1069
See application file for complete search history.

(56) References Cited

U.S. PATENT DOCUMENTS

| | | | | |
|---|---|---|---|---|
| 5,736,982 A | * | 4/1998 | Suzuki | G06T 15/30 348/E7.083 |
| 5,880,731 A | * | 3/1999 | Liles | G06F 3/0481 345/473 |

(Continued)

OTHER PUBLICATIONS

TCP/IP Guide, published Sep. 20, 2005 as indicated on p. 3, downloaded from http://www.tcpipguide.com/free/t_TCPSegmentRetransmissionTimersandtheRetransmission-3.htm (Year: 2005).*

Connell, D., "6 Tools That Stop Computer Distractions and Help You Stay on Task," published Oct. 8, 2013, downloaded from https://www.wisebread.com/6-tools-that-stop-computer-distractions-and-help-you-stay-on-task (Year: 2013).*

(Continued)

*Primary Examiner* — Eric J Yoon
(74) *Attorney, Agent, or Firm* — Artegis Law Group, LLP (57) ABSTRACT

A technique for modifying a virtual reality (VR) environment via a first computing device includes establishing a network connection with a VR application that is executing on a second computing device and generating the VR environment, receiving metadata associated with the VR environment from the second computing device via the network connection, receiving at least one user input VIA the first computing device, and, based on the metadata and on the at least one user input, transmitting data to the VR application via the network connection to modify the VR environment being generated by the VR application.

18 Claims, 6 Drawing Sheets

(56) References Cited

U.S. PATENT DOCUMENTS

| | | | | |
|---|---|---|---|---|
| 6,987,514 | B1* | 1/2006 | Beresin | G10L 13/033 |
| | | | | 345/473 |
| 9,317,956 | B2* | 4/2016 | Lee | G06T 15/00 |
| 9,349,217 | B1* | 5/2016 | Worley, III | G06F 3/011 |
| 9,818,228 | B2* | 11/2017 | Lanier | G06T 19/006 |
| 2007/0139373 | A1* | 6/2007 | Simon | G06F 3/03543 |
| | | | | 345/157 |
| 2010/0146408 | A1* | 6/2010 | Amsterdam | G06F 3/011 |
| | | | | 715/757 |
| 2014/0128161 | A1* | 5/2014 | Latta | A63F 13/06 |
| | | | | 463/42 |
| 2018/0075653 | A1* | 3/2018 | Schillings | A63H 5/00 |

OTHER PUBLICATIONS

"How to embed and play a video on an object in Unity3d and Jibe," published Apr. 8, 2013, downloaded from https://becunningandfulloftricks.com/2013/04/08/how-to-embed-and-play-a-movie-on-an-object-in-unity3d-and-jibe/ (Year: 2013).*

GameTipCenter website, "WOW: Follow a Character," published Aug. 3, 2008, downloaded from https://gametipcenter.com/wow-follow-a-character (Year: 2008).*

World of Warcraft game manual, published 2004 (Year: 2004).*

YouTube video, "Tactical Multiplayer Shooter in the Subway! Onward VR (HTC Vive Gameplay)," published Sep. 23, 2016, downloaded from https://www.youtube.com/watch?v=3A7QLoICO_Q (Year: 2016).*

Bomb_Defusal_Manual1 version 1, http://www.keeptalkinggame.com/, 23 pages.

* cited by examiner

INCORPORATING EXTERNAL GUESTS INTO A VIRTUAL REALITY ENVIRONMENT

BACKGROUND OF THE INVENTION

Field of the Invention

The present disclosure relates generally to virtual reality systems and, more specifically, to incorporating external guests into a virtual reality environment.

Description of the Related Art

Room-scale virtual reality (VR), in which a user or "guest" can physically move within and interact with a virtual environment, is a very powerful and valuable addition to storytelling technology. Because room-scale VR allows a guest to walk around a physical play area, where the physical motions of the guest within the play area are reflected in the virtual environment, room-scale VR can provide a more compelling VR experience that is less dependent on being able to render high-quality visual and audio content. In particular, with a greater level of interaction available to a guest in room-scale VR, minor deficiencies in the presentation of video or audio content are less likely to detract from the immersive aspects of the room-scale VR experience, wherein a guest perceives that he or she is actually physically present in the virtual environment.

Generally speaking, room-scale VR has implementation requirements beyond the requirement that each guest participating in a given room-scale VR experience have a conventional VR headset. For example, 360 degree position-tracking equipment, such as one or more infrared sensors, and a physical play area are typically necessary to generate a robust room-scale VR environment. Furthermore, to enable a remote guest, i.e., a guest who is in a location that is physically removed from another guest, to participate in a room-scale VR experience, an additional completely equipped physical play area is typically required. Thus, effective room-scale VR has significant logistical and cost barriers for typical consumers, particularly when multiple, remotely located guests want to share a room-scale VR experience.

In that regard, interacting with one or more other persons in a VR environment is a powerful way to develop an immersive VR experience. Among other things, interactions with other guests are oftentimes richer, more engaging, and less predictable than interactions with scripted video characters and the like. However, because of the logistical difficulties and costs associated with implementing room-scale VR with multiple guests, especially remotely located guests, incorporating human interactions into room-scale VR is not feasible for many users.

As the foregoing illustrates, what is needed in the art are more effective techniques for enabling multi-guest participation in room-scale VR environments.

SUMMARY

One embodiment of the present invention sets forth a technique for modifying a virtual reality (VR) environment via a first computing device. The technique includes establishing a network connection with a VR application that is executing on a second computing device and generating the VR environment, receiving metadata associated with the VR environment from the second computing device via the network connection, receiving at least one user input via the first computing device, and, based on the metadata and on the at least one user input, transmitting data to the VR application via the network connection to modify the VR environment being generated by the VR application.

At least one advantage of the disclosed techniques is that they allow a guest in a room-scale VR environment to interact with one or more remote guests in the context of the room-scale VR environment, even though the remote guests are not equipped with conventional VR interface devices. A further advantage is that the disclosed techniques allow a user who is not virtually present in the room-scale VR environment to control or influence the experience of a guest who is virtually present in the room-scale VR environment.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
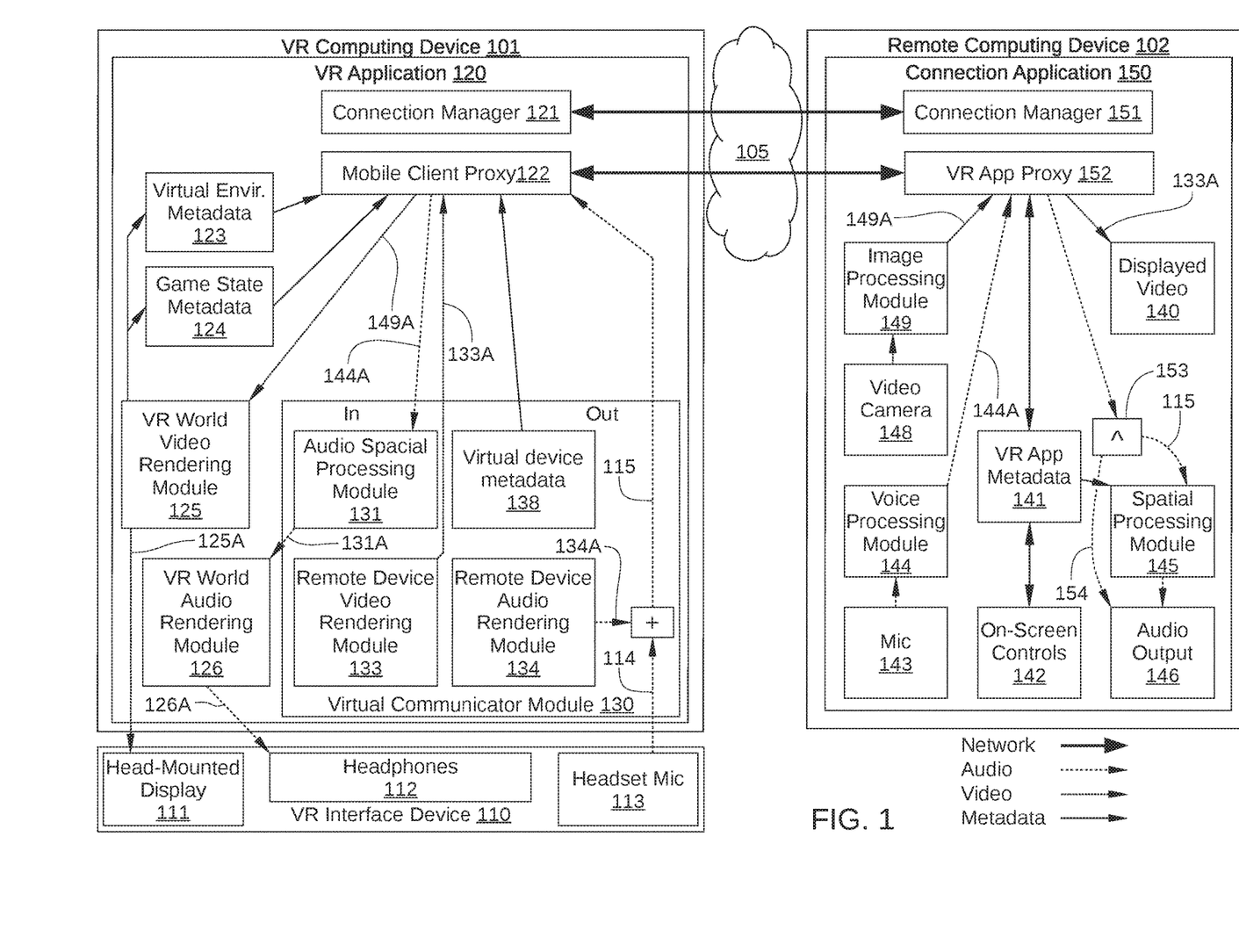
FIG. 1 illustrates a block diagram of a multi-user virtual-reality (VR) system, configured to implement one or more aspects of the present invention.

FIG. 1 illustrates a block diagram of a multi-user virtual-reality (VR) system 100, configured to implement one or more aspects of the present invention. Multi-user VR system 100 includes a VR computing device 101 running a VR application 120, a remote computing device 102 running a VR control application 150, and a VR interface device 110. In some embodiments, multi-user VR system 100 further includes a sensor-equipped physical play area (not shown for clarity) in which a user, or "guest," is located while participating in and interacting with a VR environment generated by VR computing device 101.

VR computing device 101 may be any suitable general or special purpose computer, including but not limited to a gaming console, a personal computer, a laptop, a tablet computer, a mobile device, a cellular phone, a tablet, a thin client, a set-top box, and a media streaming device, among others. For example, in some embodiments, VR computing device 101 may have the configuration of a computing device 200 described below in conjunction with FIG. 2. VR computing device 101 is configured to generate a VR environment by rendering video and audio content, and transmit the rendered content through a wired or wireless link to VR interface device 110. As shown, VR computing device 101 is communicatively coupled to remote computing device 102 via a network 105. Network 105 may be any technically feasible type of communications network that allows data to be exchanged between VR computing device 101 and external entities or devices, such as remote computing device 102 (described below). For example, network 105 may include a wide area network (WAN), a local area network (LAN), a wireless (WiFi) network, and/or the Internet, among others.

Content rendered by VR computing device 101 can be for any type of computer application, and may include one or more types of content such as VR game, movie, audio, images, and multimedia, among others. In some embodiments, some or all such rendered content is generated by VR computing device 101. In other embodiments, at least a portion of the rendered content is streamed from a remote content source, for example from remote computing device 102 over network 105, and/or from other computing devices, for example via the Internet, such as from a cloud gaming infrastructure (not shown), or from any other remote content source.

Remote computing device 102 may be any general or special purpose computer suitable for running VR control application 150, described below. Thus, remote computing device 102 may be a gaming console, a personal computer, a laptop, a tablet computer, a mobile device, a cellular phone, a tablet, a thin client, a set-top box, and a media streaming device, among others. In some embodiments, Remote computing device 102 may have the configuration of a computing device 200 described below in conjunction with FIG. 2.

VR application 120 is a computer application configured to generate a VR environment for a guest employing VR interface device 110, receive game commands from the guest and/or from VR control application 150, receive three-dimensional sensor input indicating location and orientation of the guest, and update the state of the video game based on the received commands in game state metadata 124. In addition, VR application 120 is configured to establish a network connection with remote computing device 102, either in response to an action or input by the guest employing VR interface device 110, or in response to receiving a connection request initiated by VR control application 150. To facilitate operation of VR control application 150, VR application 120 is also configured to transmit via network 105 metadata that are associated with the VR environment being generated, such as virtual environment metadata 123 and/or game state metadata 124. VR application 120 is further configured to receive from VR control application 150, via network 105, data associated with one or more user inputs to remote computing device 102. For example, VR application 120 is configured to receive commands that can be executed by VR application 120 to modify the current VR environment and audio and/or video data associated with the user of remote computing device 120. As such, VR application 120 includes, among other things, a connection manager 121, a mobile client proxy 122, a VR world video rendering module 125, a VR world audio rendering module 126, and a virtual communicator module 130.

Connection manager 121 is configured to manage, and in some embodiments to initiate, network connections between VR application 120 and VR control application 150. Mobile client proxy 122 serves as a connection point for VR control application 150 to VR application 120. VR world video rendering module 125 is a video source module that typically includes rendering logic, e.g., hardware, firmware, and/or software stored on a computer readable medium such as a memory associated with VR computing device 101. The rendering logic is configured to create video frames of the video stream based on the game state of the currently generated VR environment. Thus, VR world video rendering module 125 typically includes processing stages configured for determining three-dimensional spatial relationships between objects and/or any guests participating in the currently generated VR environment. In addition, VR world video rendering module 125 is typically configured to apply appropriate textures and the like, based on game state metadata 124 and the viewpoint of a particular guest. VR world video rendering module 125 produces raw video that can be encoded according to any suitable standard prior to communication to VR interface device 110 and/or remote computing device 102, such as an Adobe Flash standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is characterized by a frame size and a frame rate, where the frame rate is the number of video frames per second. Typical frame sizes include 800×600, 1280×720 (e.g., 720p), and 1024×768, among others. It is noted that a video stream transmitted to VR interface device 110 may be a different frame rate and/or different frame size than a video stream transmitted to remote computing device 102. In some embodiments, some or all of VR world video rendering module 125 is disposed within a graphics processing unit (GPU). In operation, VR world video rendering module 125 transmits suitable video content 125A to VR interface device 110 as shown.

VR world audio rendering module 126 typically includes rendering logic, e.g., hardware, firmware, and/or software stored on a computer readable medium such as a memory associated with VR computing device 101. The rendering logic is configured to create three-dimensional audio content 126A and effects consistent with the currently generated VR environment. Thus, VR world audio rendering module 126 generates a suitable audio mix 126A for implementation in the currently generated VR environment. For example, audio mix 126A may include audio associated with the VR environment being generated combined with remote guest audio 144A (which is generated by VR control application 150, described below).

Virtual environment metadata 123 includes information related to physical objects located in the physical play area dedicated to the EV environment and boundaries of the physical play area. Game state metadata 124 generally includes information that tracks location and orientation (including point of view) of each guest in the currently generated VR environment, and the position of virtual objects in the currently generated VR environment. The game state may also include properties, images, colors and/or textures of objects. Game state metadata 124 may be maintained and modified based on game rules, settings, and/or game commands, where the latter may be provided by a guest in the currently generated VR environment and/or by VR control application 150. In some embodiments, virtual environment metadata 123 and game state metadata 124 are stored in a memory associated with VR computing device 101. VR interface device 110 is employed by a user, or "guest," to interact with the VR environment generated by VR computing device 101. In the embodiment illustrated in FIG. 1, VR interface device 110 includes headphones 111, a head-mounted display 112, and a headset mic 113. In some embodiments, VR interface device 110 includes head motion tracking sensors, such as gyroscopes, accelerometers, and/or structured light systems and/or a gaming controller (not shown).

Headphones 111 may include any audio headphone system suitable for use in VR interface device 110. In some embodiments, headphones 111 include stereo and/or three-dimensional sound capability.

Virtual communicator module 130 includes an audio spatial processing module 131, a remote device video rendering module 133, and a remote device audio rendering module 134. Audio spatial processing module 131 generates an audio output 131A that modifies remote guest audio 144A to correspond with the current location of a virtual object in the VR environment that is employed to incorporate into the VR environment a remote guest who is using remote computing device 102. For example, if the virtual object is being held in the hand of the local guest and the remote guest appears on or in the virtual object, audio output 131A includes a version of remote guest audio 144A that is modified so that remote guest audio 144A seems to emanate from the virtual object. Such virtual objects are described in greater detail below. Remote device video rendering module 133 generates suitable video content 133A for VR control application 150 and remote computing device 102. For example, video content 133A may include a third-person view of the local guest in the context of the VR environment, such as from the point-of-view of a virtual object associated with the remote guest. Remote device audio rendering module 134 generates suitable audio content 134A for VR control application 150 and remote computing device 102. For example, audio content 134A may include ambient audio as heard from the point-of-view of the above-described virtual object. Audio mix 134A may be combined with output 114 from headset mic 113 to form audio mix 115, which is transmitted to VR control application 150 and remote computing device 102.

In operation, VR application 120 receives remote guest video 149A from VR control application 150 and transmits video content 125A and audio content 126A to VR interface device 110. VR communicator module 130 updates and transmits virtual device metadata 138, video content 133A, and audio mix 115 to VR application 120. Virtual device metadata 138 indicates position, acceleration, and orientation information associated with VR interface device 110, with respect to the currently generated VR environment.

VR control application 150 is configured to enable the incorporation of a remote guest into the VR environment currently generated by VR application 120. Thus, a particular room-scale VR environment can be enjoyed by multiple guests, even when some or most of the participants do not have access to a fully sensored, room-scale VR play area. According to embodiments of the invention, VR control application 150, in conjunction with VR application 120, enables a remote guest to control, interact with, or otherwise modify the VR environment currently generated by VR application 120. More specifically, the remote guest can provide commands and/or audio and video content to VR application 120 to enhance the VR experience of the guest employing VR interface device 110, i.e., the "local guest". In addition, to make the VR experience of the local guest more fully immersive, the audio and/or video originating with the remote guest can be modified by VR control application 150, so that the audio and/or video content actually experienced by the local guest is presented in a way that better suits the VR environment currently being generated. For example, in a fantasy setting, the appearance of the remote guest may be altered to appear to be a fantastic creature or magically animated object.

As shown, VR control application 150 includes a connection manager 151, a VR application proxy 152, VR application metadata 141, on-screen controls 142, a mic 143, a voice processing module 144, a spatial processing module 145, a video camera 148, and an image processing module 149.

Connection manager 151 is configured to manage, and in some embodiments to initiate, network connections between VR application 120 and VR control application 150. For example, in embodiments in which network 105 includes a WAN, connection manager 151, in conjunction with connection manager 121, enable WAN connections between VR application 120 and VR control application 150, such as via a suitable connection server.

VR application proxy 152 serves as a connection point for VR application 120 to VR control application 150. In some embodiment, VR application proxy 152 and mobile client proxy 122 are configured to establish a peer-to-peer connection therebetween.

VR application metadata 141 is received from VR application 120 and stored locally in remote computing device 102, for example in a memory associated with remote computing device 102. On-screen controls 142 are displayed on a display screen associated with remote computing device 102, and enable a remote guest to employ remote computing device 102 for controlling or otherwise interacting with VR application 120. Mic 143 captures voice input from the remote guest, and voice processing module 144 is configured to modify such voice input, when indicated by VR application metadata 141 or by any other settings associated with the VR environment currently being generated by VM application 120. For example, voice input from the remote guest may be modified to better suit the role in the VR environment associated with the remote guest. Voice processing module 144 then transmits remote guest audio 144A to VR application proxy 152 for transmission, typically in real-time, to VR application 120 via network 105.

Spatial processing module 145 receives combined audio mix 115 from VR application 120 (after being separated by audio-video module 153), and modifies the audio output included therein based on the relative positions in the VR environment of the guest and the remote guest, as well as any other pertinent VR application metadata 141. Spatial processing module 145 then causes the suitably modified guest audio to be played to the remote guest, as well as any other pertinent application audio 154 received from VR application 120.

Video camera 148 may be any technically feasible digital imaging apparatus, such as a camera incorporated into a smartphone or smartwatch, a webcam associated with a laptop compute, tablet, or desktop computer, and the like.

Video camera 148 is configured to capture video data of the remote guest for subsequent incorporation, when appropriate, into the VR environment currently generated by VR application 120. Image processing module 149 is configured to modify such video data, when indicated by VR application metadata 141 or by any other settings associated with the VR environment currently being generated by VM application 120. Image processing module 149 then transmits remote guest video 149A to VR application proxy 152 for transmission, typically in real-time, to VR application 120 via network 105. Remote guest video 149A can then be incorporated into video content 125A, for example as a two-dimensional entity in the VR environment. Thus, even though the remote user cannot be incorporated as a three-dimensional object that changes position and orientation based on physical actions of the remote guest, the remote guest can still participate actively and interactively with other guests in the VR environment.

It is noted that, in the embodiment illustrated in FIG. 1, various modules of VR control application 150 are configured to perform computationally intensive activities associated with the incorporation of the remote guest into the VR environment currently generated by VR application 120. Specifically, voice processing module 144 alters the voice of the remote guest and image processing module 149 modifies video of the remote guest, as appropriate. Thus, the incorporation of the remote guest into a VR environment generated by VR application 120 presents little additional computational load on the computing device running VR application 120.

Figure 2:
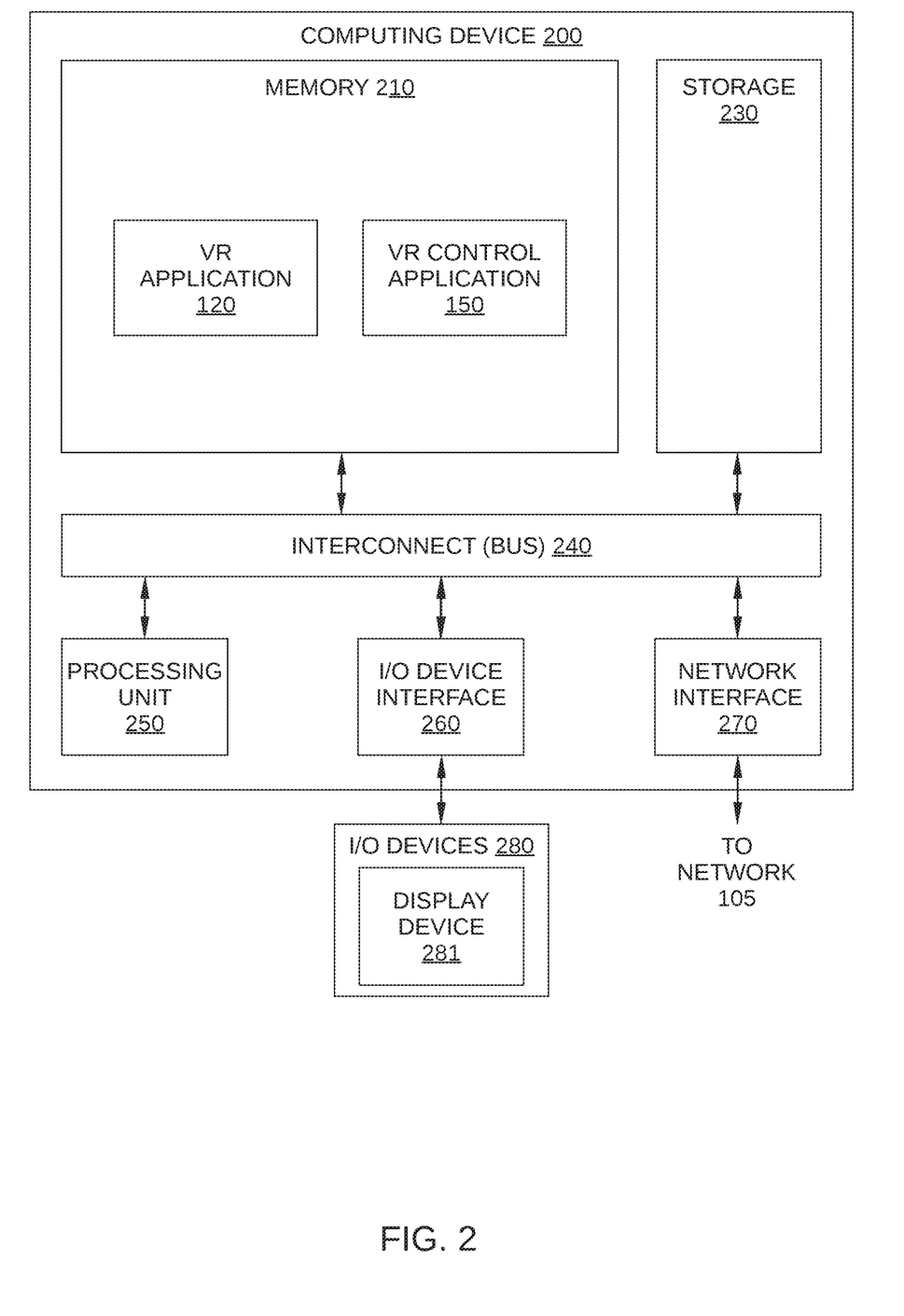
FIG. 2 is an illustration of a computing device configured to implement various embodiments of the present invention.

FIG. 2 is an illustration of a computing device 200 configured to implement various embodiments of the present invention. For example, computing device 200 may be employed as VR computing device 101 or remote computing device 102 in FIG. 1. Computing device 200 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. In operation, computing device 200 is configured to execute one or more of VR application 120 and/or VR control application 150, as described herein. Computing device 200 is further configured to display graphical images and/or videos to the end-user via input/output (I/O) devices 280 (described below). It is noted that the computing device described herein is illustrative and that any other technically feasible configurations fall within the scope of the present invention.

As shown, computing device 200 includes, without limitation, an interconnect (bus) 240 that connects a processing unit 250, an input/output (I/O) device interface 260 coupled to input/output (I/O) devices 280, memory 210, a storage 230, and a network interface 270. Processing unit 250 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 250 may be any technically feasible hardware unit capable of processing data and/or executing software applications, including VR application 120 and/or VR control application 150. Further, in the context of this disclosure, the computing elements shown in computing device 200 may correspond to a physical computing system (e.g., a system in a data center) or may be a virtual computing instance executing within a computing cloud.

I/O devices 280 may include devices capable of providing input, such as a keyboard, a mouse, a touch-sensitive screen, and so forth, as well as devices capable of providing output, such as a display device 281. Display device 281 may be a computer monitor, a video display screen, a display apparatus incorporated into a hand held device, or any other technically feasible display screen configured to present dynamic or animated media to an end-user. In some embodiments, display device 281 may be incorporated into VR interface device 110. Additionally, I/O devices 280 may include devices capable of both receiving input and providing output, such as a touchscreen, a universal serial bus (USB) port, and so forth. I/O devices 280 may be configured to receive various types of input from an end-user of computing device 200, and to also provide various types of output to the end-user of computing device 200, such as displayed digital images or digital videos. In some embodiments, one or more of I/O devices 280 are configured to couple computing device 200 to a network 105.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including VR application 120 and/or VR control application 150.

Incorporating External Guests into a Virtual Reality Environment

Figure 3:
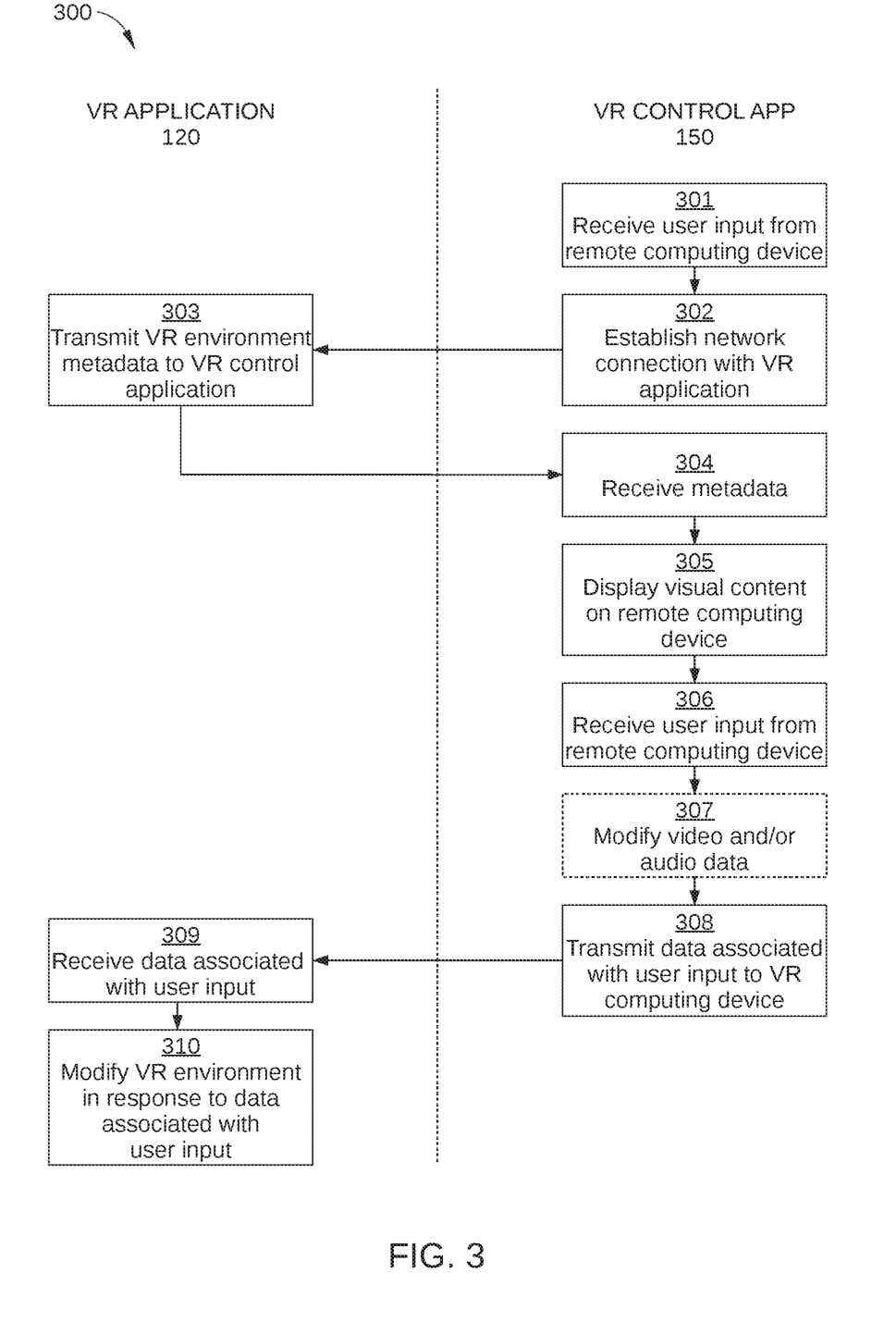
FIG. 3 is a flowchart of method steps for modifying a VR environment from a remote computing device, according to various embodiments of the present invention.

FIG. 3 is a flowchart of method steps for modifying a VR environment from a remote computing device, according to various embodiments of the present invention. Although the method steps are described with respect to multi-user VR system 100, persons skilled in the art will understand that the method steps may be also performed with other VR systems without exceeding the scope of the invention. Prior to the method steps, a VR environment is generated by VR application 120, in which a local guest employs VR interface device 110 to experience the VR environment.

As shown, a method 300 begins at step 301, where VR control application 150 receives a user input from remote computing device 102, or data associated with a user input from remote computing device 102. For example, in some embodiments, a user of remote computing device 102, i.e., a remote guest, uses an input device of remote computing device 102 or a gesture on a touch-sensitive screen of remote computing device 102 to initiate participation in the VR environment currently generated by VR application 120. Thus, the remote guest can begin the process of modifying or otherwise interacting with the VR environment via an electronic tablet, smartphone, laptop computer, or some other computing device that is not specifically designed for use in a room-scale VR environment.

In step 302, VR control application 150 establishes a network connection with VR application 120. For example, in some embodiments, VR control application 150 initiates a connection request with VR application 120, VR application 120 sends an appropriate acknowledgement, and a peer-to-peer or other suitable network connection between VR control application 150 and VR application 120 is established.

In step 303, VR application 120, in response to the network connection being established between VR application 120 and VR control application 150, transmits suitable metadata associated with the VR environment and/or with the local guest to VR control application 150. Specifically, some or all of virtual device metadata 138, game state metadata 124, and/or virtual environment metadata 123 are transmitted to VR control application 150, thereby facilitating at least a limited VR experience for the remote guest.

In step 304, VR control application 150 receives the metadata associated with the VR environment and/or with the local guest.

In step 305, VR control application 150 causes pertinent visual content, such as displayed video 140, to be displayed by remote computing device 102 for the benefit of the remote guest. For example, in some embodiments, a point-of-view video is displayed by remote computing device 102 showing the point-of-view of the remote guest in the VR environment. Thus, even though the remote guest cannot enjoy the visually and aurally immersive experience available to a user equipped with a conventional VR interface device, the remote guest can still participate in the VR environment in response to elements of the VR environment that are within the displayed field of view. Alternatively or additionally, in some embodiments, a third-person view of the local guest is displayed by remote computing device 102 in the context of the VR environment, as illustrated in FIG. 4.

Figure 4:
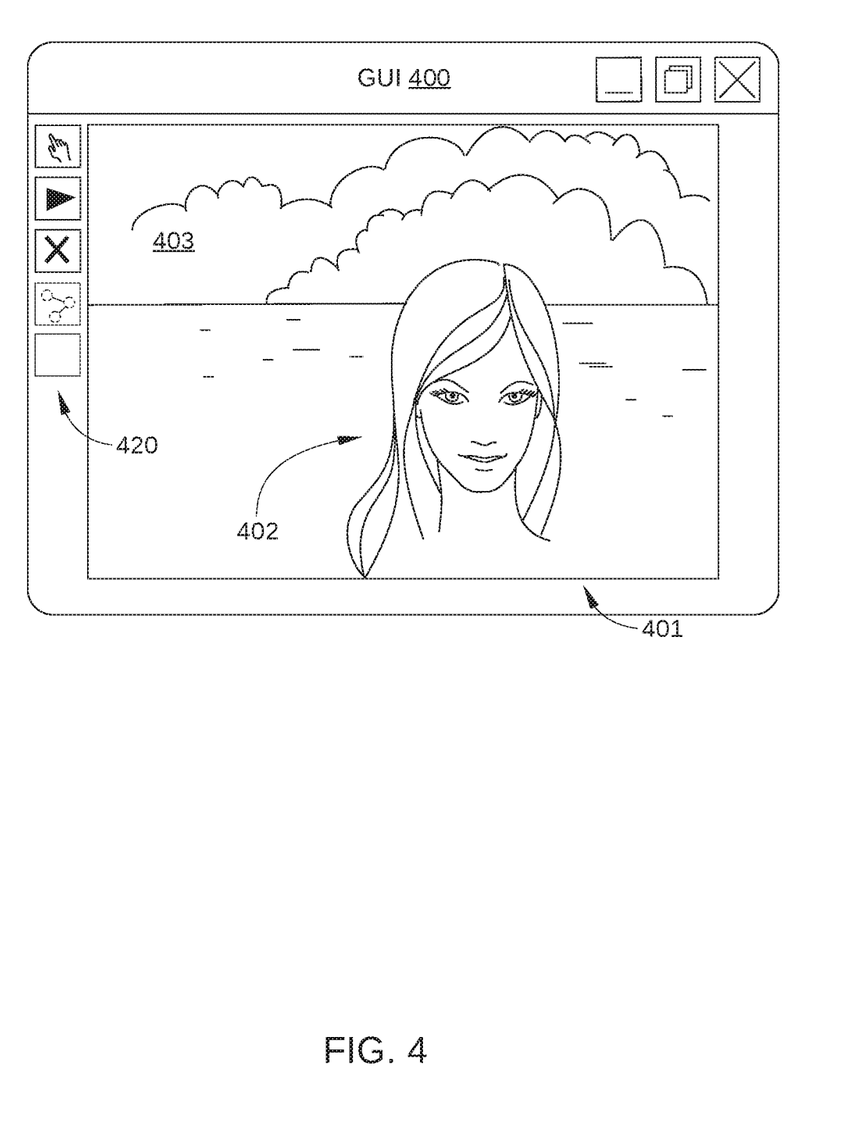
FIG. 4 schematically illustrates a graphical user interface (GUI) associated with the VR control application of FIG. 1 and displayed by the remote computing device of FIG. 1, according to various embodiments of the present invention.

FIG. 4 schematically illustrates a graphical user interface (GUI) 400 associated with VR control application 150 and displayed by remote computing device 102, according to various embodiments of the present invention. GUI 400 is displayed on a display device of remote computing device 102, such as a touch screen or the like. As shown, GUI 400 includes a third-person view 401 of a local guest 402, and, in some embodiments, one or more control buttons 420 that enable the remote user to modify or control one or more aspects of the VR environment.

In some embodiments, third-person view 401 depicts the local guest in the context of the VR environment 403. For example, in such embodiments, third-person view 401 depicts the local guest from the point of view of a virtual device that is displaying the remote guest in VR environment 403. Thus, when the local guest moves that virtual device or virtual object, third-person view 401 changes. Alternatively or additionally, third-person view 401 may depict video of the local guest in the physical world, i.e., without any visual or audio modifications generated by VR application 120 as part of the VR environment. Third-person view 401 enables the remote guest to monitor the local user who is experiencing the more immersive VR environment. Consequently, third-person view 401 provides more context for the remote user when deciding what modifications, settings, and/or other VR interactions are appropriate for the local guest, so that the remote guest can adjust, eliminate, or add settings or events accordingly. Thus, VR application 120 allows an adult guest to monitor and/or modify a VR environment in real time, so that a younger local guest is not intimidated, frightened, or overwhelmed by the immersive VR experience.

In step 306, VR control application 150 receives a user input from remote computing device 102, or data associated with a user input from remote computing device 102. For example, in some embodiments, the remote guest uses an input device of remote computing device 102 or a gesture on a touch-sensitive screen of remote computing device 102 to send a command to be executed by VR application 120, such as initiating or canceling an event in the VR environment, changing a setting that affects the VR environment, etc. Alternatively or additionally, video and/or audio data associated with the remote guest may be received by VR control application 150, such as from voice processing module 144 and/or image processing module 149.

In some embodiments, the remote guest performs the user input received by VR control application 150 in step 306 in response to the visual content displayed by remote computing device 102 in step 305. Thus, while monitoring the local guest via displayed video 140, the remote guest can initiate participation in or modification of the VR environment to enhance the VR experience of the local guest.

In optional step 307, VR control application 150 modifies video and/or audio data received from image processing module 149 in step 306. As set forth above, such video and/or audio data may be modified so that the remote guest is perceived by the local guest in the VR environment as an element of the VR environment, such as an animated animal or object, thereby maintaining the immersive experience of room-scale VR.

It is noted that in some embodiments, video data associated with the remote guest received in step 306 can have a significantly different (i.e., lower) frame rate than that presented to the local guest by VR interface device 110. However, because the remote guest can be displayed in the VR environment as a two-dimensional image or other non-conventional actor, the lower visual quality is unlikely to weaken the immersive experience of the local guest. In fact, the contrast between the quality of presentation of the remote guest and the remainder of the VR environment can potentially heighten the realism of the VR environment.

In step 308, VR control application 150 transmits the data associated with the user input to VR application 120. In embodiments in which such data include audio and/or video data, the data may be streamed in real time.

In step 309, VR application 120 receives, via network 105, the data transmitted by VR control application 150 in step 308.

In step 310, VR application 120 modifies the VR environment in response to the data received in step 309. For example, in embodiments in which VR application 120 receives a command from VR control application 150, VR application 120 executes the command. In embodiments in which VR application 120 receives video data associated with the remote guest, VR application 120 causes the video data to be displayed appropriately to the local guest. Because the remote guest is not equipped with a conventional VR interface device, such as VR interface device 110, only video and audio data can be provided to VR application 120. That is, VR control application 120 generally cannot provide physical orientation, motion, or location information associated with the remote guest. Instead, presentation of the video data is mostly limited to a two-dimensional scenario, such as on a screen, projected on a wall, on a playing card, and the like. Thus, in some embodiments, video of the remote guest may appear on a surface of a virtual object that can be viewed and manipulated by the local guest in the VR environment. One such embodiment is illustrated in FIG. 5.

Figure 5:
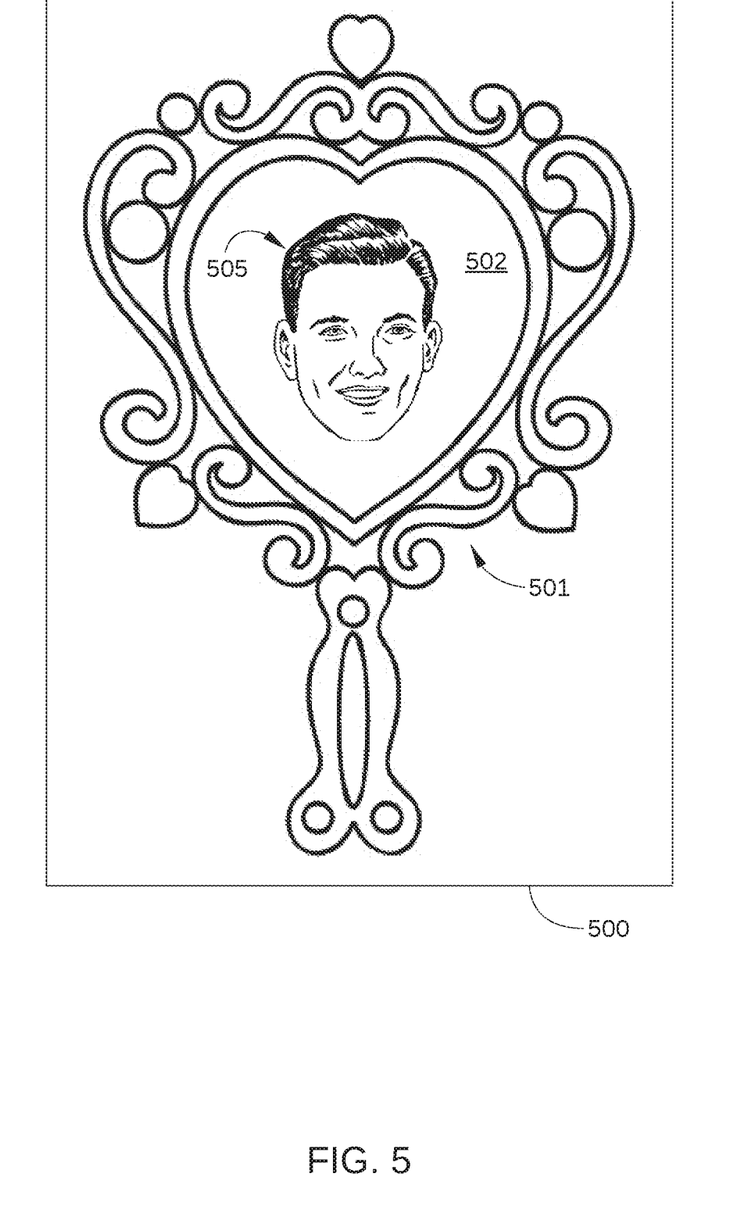
FIG. 5 schematically illustrates a portion of a VR environment generated by the VR application of FIG. 1, according to various embodiments of the present invention.

FIG. 5 schematically illustrates a portion 500 of a VR environment generated by VR application 120, according to various embodiments of the present invention. As shown, a virtual object 501 is visible in portion 500 of the VR environment, such as an object with a suitable planar surface 502. For example, in the embodiment illustrated in FIG. 5, virtual object 501 is a hand mirror, and the video data associated with the remote guest is presented in the VR environment as being disposed on planar surface 502 of virtual object 501. Thus, video of the face and/or person of a remote guest 505 can be incorporated into the VR environment even though remote guest 505 does not have access to a VR interface device 110.

Figure 6:
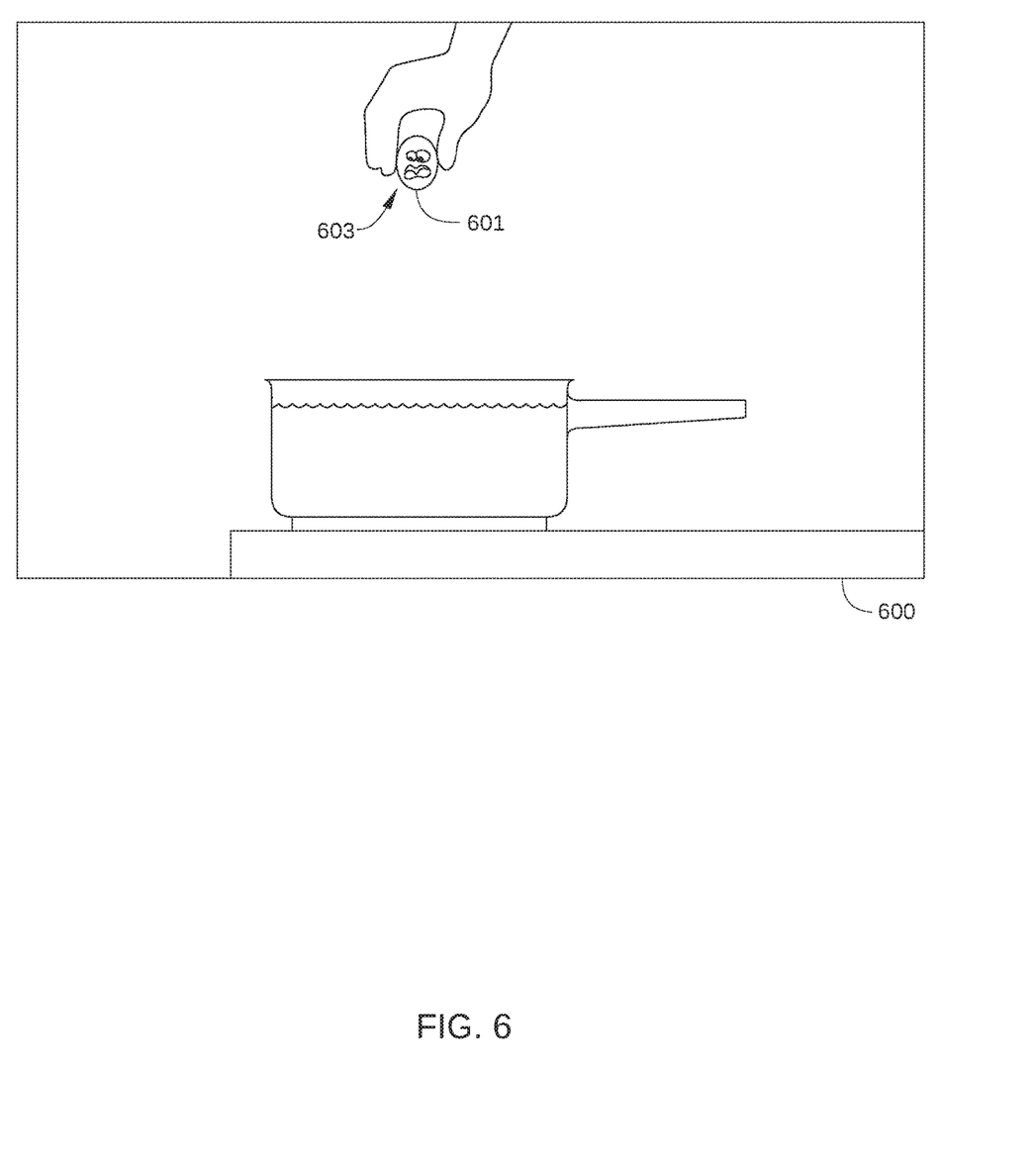
FIG. 6 schematically illustrates a portion of a VR environment generated by VR the application of FIG. 1, according to various other embodiments of the present invention.

Alternatively or additionally, in some embodiments, the face and/or person of the remote guest may be combined, by image processing module 149 of VR control application 120, with an animated figure, animal, or other object. One such embodiment is illustrated in FIG. 6. FIG. 6 schematically illustrates a portion 600 of a VR environment generated by VR application 120, according to various other embodiments of the present invention. As shown, a virtual object 601 includes video of the face 603 of a remote guest, wherein face 603 is superimposed on virtual object 601 included in the VR environment. In some embodiments, virtual object 601 can be manipulated by the local guest, whereas in other embodiments, virtual object 601 may be a fixed object in the VR environment, such as a wall. Thus, face 603 of the remote guest can be incorporated on any suitable virtual object included in the VR environment.

In the embodiment of method 600 described above, VR control application 150 initiates the establishment of the network connection between VR control application 150 and VR application 120. In other embodiments, VR application 120 may initiate the establishment of such a network connection. For example, in such embodiments, VR application 120 may initiate interaction with remote computing device 102 in response to a particular input or action on the part of the local guest in the VR environment, such as opening a book, entering a room, etc.

In sum, an application running on a remote computing device enables a remote user to be incorporated into a VR environment. Specifically, video and/or audio data associated with the remote user and captured by the remote computing device is transmitted to a VR application that is running on a VR computing device and is generating a VR environment. The video and/or audio data associated with the remote user is then presented to a guest in the VR environment, for example disposed on a virtual two-dimensional surface in the VR environment. Commands that modify the VR environment can also be sent from the remote computing device to the VR computing device for execution, thereby enabling a remote user to control and/or modify the VR environment.

At least one advantage of the disclosed techniques is that a guest in a VR environment can interact with one or more remote guests in the context of the VR environment, even though the remote guests are not equipped with conventional VR interface devices. A further advantage is that a user who is not in a VR environment can control or otherwise influence the experience of a guest in the VR environment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

I claim:

1. A method for modifying a room-scale virtual reality (VR) environment via a first computing device, the method comprising:
   establishing a network connection with a VR application that is executing on a second computing device and generating the VR environment, wherein:
      a physical space equipped with one or more sensors defines a physical play area associated with the VR environment, wherein the VR environment is generated within the physical space, and
      a VR interface device, physically separate from the one or more sensors within the physical play area, displays the VR environment;
   receiving metadata associated with the VR environment from the second computing device via the network connection, wherein:
      the metadata specifies one or more locations of a set of virtual objects included in the VR environment,
      the VR interface device enables a user of the VR interface device to interact with the VR environment via a first virtual object in the set of virtual objects,
      the first virtual object represents the user of the VR interface device, and
      the first computing device enables a user of the first computing device to, without occupying the physical play area and from a perspective of a two-dimensional surface of a second virtual object, view the first virtual object within the VR environment, and
      the second virtual object represents the user of the first computing device;
   receiving a first user input via the first computing device;
   modifying, at the first computing device, the first user input based on the one or more locations to generate VR content that shares one or more characteristics of the VR environment, wherein the VR content includes the second virtual object; and
   transmitting the VR content to the VR application via the network connection to modify the VR environment being generated by the VR application, wherein a movement within the physical play area of the user of the VR interface device, captured by the one or more sensors, modifies a location of the second virtual object within the VR environment.

2. The method of claim 1, wherein the first user input comprises an input received via an on-screen control that is displayed by the first computing device.

3. The method of claim 2, further comprising transmitting, to the VR application, at least one command that is executed by the VR application to modify the VR environment.

4. The method of claim 1, wherein the first user input comprises at least one of:
   audio data based on audio input received from the user of the first computing device; or
   video data based on video of the user of the first computing device.

5. The method of claim 4, further comprising modifying the audio data or the video data to satisfy the one or more characteristics.

6. The method of claim 1, wherein the metadata associated with the VR environment comprises at least one of game state metadata or virtual environment metadata.

7. The method of claim 1, wherein establishing the network connection comprises:
   receiving a connection request from the VR application, and
   in response to the connection request, transmitting an acknowledgement to the VR application.

8. The method of claim 1, wherein establishing the network connection comprises:
   receiving a second user input via the first computing device; and
   in response to the second user input, initiating a connection request with the VR application.

9. A method for modifying a room-scale virtual reality (VR) environment being generated via a local computing device, the method comprising:
   establishing a network connection with a remote computing device;
   transmitting, via the network connection, metadata associated with the VR environment, wherein:
      a VR application executing on the local computing device generates the VR environment,
      a physical space equipped with one or more sensors defines a physical play area associated with the VR environment,
      the VR environment is generated within the physical space,
      a VR interface device, physically separate from the one or more sensors within the physical play area, displays the VR environment,
      the metadata specifies one or more locations of a set of virtual objects included in the VR environment,
      the VR interface device enables a user of the VR interface device to interact with the VR environment via a first virtual object in the set of virtual objects,
      the first virtual object represents the user of the VR interface device;
   receiving, via the network connection, data associated with VR content generated by the remote computing device located outside of the physical space, wherein:
      the remote computing device enables a user of the remote computing device to, without occupying the physical play area and from a perspective of a two-dimensional surface of a second virtual object, view the first virtual object within the VR environment,
      the second virtual object represents the user for the remote computing device,
      the VR content is generated by modifying a first user input received from a user of the remote computing device based on the one or more locations, and
      the VR content shares one or more characteristics of the VR environment; and
   modifying the VR environment based on the data, wherein a movement within the physical play area made by the user of the VR interface device, captured by the one or more sensors, modifies a location of the second virtual object within the VR environment.

10. The method of claim 9, wherein the first user input comprises an input via an on-screen control that is caused to be displayed by the remote computing device.

11. The method of claim 9, wherein the data associated with the first user input includes commands that are executed by the VR application to modify the VR environment.

12. The method of claim 9, wherein the data associated with the first user input comprises:
audio data associated with a user of the remote computing device,
video data associated with a user of the remote computing device, or
a combination of both the audio data and the video data.

13. The method of claim 9, wherein modifying the VR environment includes at least one of:
playing audio data associated with a user of the remote computing device,
displaying video data associated with a user of the remote computing device, or
executing a command included in the data.

14. One or more non-transitory computer-readable storage media including instructions that, when executed by one or more processors, cause the one or more processors of a first computing device to perform the steps of:
establishing a network connection with a virtual reality (VR) application that is executing on a second computing device and generating a room-scale VR environment, wherein:
a physical space equipped with one or more sensors defines a physical play area associated with the VR environment, wherein the VR environment is generated within the physical space, and
a VR interface device, physically separate from the one or more sensors within the physical play area, displays the VR environment;
receiving metadata associated with the VR environment from the second computing device via the network connection, wherein:
the metadata specifies one or more locations of a set of virtual objects included in the VR environment,
the VR interface device enables a user of the VR interface device to interact with the VR environment via a first virtual object in the set of virtual objects,
the first virtual object represents the user of the VR interface device, and
the first computing device enables a user of the first computing device to, without occupying the physical play area and from a perspective of a two-dimensional surface of a second virtual object, view the first virtual object within the VR environment, and
the second virtual object represents the user of the first computing device;
receiving a first user input via the first computing device;
modifying, at the first computing device, the first user input based on the one or more locations to generate VR content that shares one or more characteristics of the VR environment, wherein the VR content includes the second virtual object; and
transmitting the VR content to the VR application via the network connection to modify the VR environment being generated by the VR application, wherein a movement within the physical play area of the user of the VR interface device, captured by the one or more sensors, modifies a location of the second virtual object within the VR environment.

15. The one or more non-transitory computer-readable storage media of claim 14, further comprising:
receiving, via the network connection, audio data that is generated by the VR interface device; and
causing the audio data to be played by the first computing device.

16. The one or more non-transitory computer-readable storage media of claim 14, further comprising:
receiving, via the network connection, video data generated by the VR interface device; and
causing the video data to be displayed by the first computing device.

17. The one or more non-transitory computer-readable storage media of claim 14, wherein the first user input comprises an input received via an on-screen control that is displayed by the first computing device.

18. The one or more non-transitory computer-readable storage media of claim 17, further comprising transmitting, to the VR application, at least one command that is executed by the VR application to modify the VR environment.

* * * * *